United States Patent
Innes et al.

(10) Patent No.: US 10,374,470 B1
(45) Date of Patent: Aug. 6, 2019

(54) WIRELESS ENERGY TRANSFER IN A FAR-FIELD ENVIRONMENT

(71) Applicant: AT&T Intellectual Property I, L.P., Atlanta, GA (US)

(72) Inventors: Timothy Innes, Atlanta, GA (US); James Pratt, Round Rock, TX (US); Eric Zavesky, Austin, TX (US); Bhumit Patel, Atlanta, GA (US); Nigel Bradley, McDonough, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/118,961

(22) Filed: Aug. 31, 2018

(51) Int. Cl.
*H01Q 1/36* (2006.01)
*H01Q 3/00* (2006.01)
(Continued)

(52) U.S. Cl.
CPC .......... *H02J 50/90* (2016.02); *H01Q 1/36* (2013.01); *H01Q 3/005* (2013.01); *H02J 7/025* (2013.01); *H02J 50/23* (2016.02); *H04W 4/024* (2018.02); *H04W 72/048* (2013.01); *H04W 4/029* (2018.02)

(58) Field of Classification Search
CPC .......... H01Q 15/08; H01Q 1/241; H01Q 3/18; H01Q 3/26; H01Q 1/36; H01Q 3/005; H04W 72/0453; H04W 16/28; H04W 4/029; H04W 72/048; B33Y 40/00; G02B 1/002; H02J 50/90; H02J 50/23; H02J 7/025
See application file for complete search history.

(56) References Cited

U.S. PATENT DOCUMENTS 8,072,380 B2   12/2011   Crouch
8,159,364 B2    4/2012   Zeine
(Continued)

FOREIGN PATENT DOCUMENTS

CN   102185529    6/2016
EP     3145053    3/2017
(Continued)

OTHER PUBLICATIONS

A Metamaterial for Directive Emission vol. 89 No. 21 Dated Nov. 18, 2002.*
(Continued)

*Primary Examiner* — Nizar N Sivji
(74) *Attorney, Agent, or Firm* — Kilpatrick Townsend & Stockton LLP

(57) ABSTRACT

An antenna system can be controlled to wirelessly transmit power to a mobile device in a far-field environment by using different types of metamaterials to shape and constrain the beam of power, controlling the antenna based on a predicted position of the mobile device, or both of these. The mobile device can use the power to charge a power source associated with the mobile device. The predicted position of the mobile device can be determined using position information, motion and direction information, and height information about the mobile device. The position of the antenna can be controlled so that the power is wirelessly transmitted to the mobile device in the Fresnel zone of the antenna.

20 Claims, 7 Drawing Sheets

(51) Int. Cl.
*H02J 7/02* (2016.01)
*H02J 50/23* (2016.01)
*H02J 50/90* (2016.01)
*H04W 4/024* (2018.01)
*H04W 4/029* (2018.01)
*H04W 72/04* (2009.01)

(56) References Cited

U.S. PATENT DOCUMENTS

| | | |
|---|---|---|
| 8,334,619 B2 | 12/2012 | Takei |
| 8,779,629 B2 | 7/2014 | Kim et al. |
| 9,030,161 B2 | 5/2015 | Lu et al. |
| 9,772,401 B2 | 9/2017 | Widmer et al. |
| 9,853,485 B2 | 12/2017 | Contopanagos |
| 2011/0140537 A1 | 6/2011 | Takei |
| 2011/0266879 A1 | 11/2011 | Kim et al. |
| 2012/0274147 A1 | 11/2012 | Stecher et al. |
| 2013/0137455 A1 | 5/2013 | Xia et al. |
| 2014/0062215 A1* | 3/2014 | Seo .......... H01Q 15/0086 307/104 |
| 2014/0349569 A1* | 11/2014 | Hyde .......... H04B 7/1555 455/11.1 |
| 2015/0180120 A1* | 6/2015 | Pietraski .......... H01Q 15/0086 342/368 |
| 2016/0049823 A1 | 2/2016 | Stein et al. |
| 2016/0079811 A1 | 3/2016 | Seo et al. |
| 2016/0301255 A1 | 10/2016 | Zeine |
| 2016/0380486 A1 | 12/2016 | Hajimiri et al. |
| 2017/0069973 A1 | 3/2017 | Black et al. |
| 2017/0077755 A1 | 3/2017 | Corum et al. |
| 2017/0250561 A1* | 8/2017 | Li .......... H02J 50/90 |
| 2018/0069438 A1 | 3/2018 | Bit-babik et al. |
| 2018/0090992 A1 | 3/2018 | Shrivastava et al. |
| 2018/0281303 A1* | 10/2018 | Yerazunis .......... B29C 67/0085 |

FOREIGN PATENT DOCUMENTS

| | | |
|---|---|---|
| EP | 3166205 | 5/2017 |
| IN | 2980CHE2011 | 6/2013 |
| JP | H08130840 | 5/1996 |
| JP | 2007022382 | 2/2007 |
| JP | 5385298 | 10/2013 |
| JP | 2014195364 | 10/2014 |
| WO | 2010138994 | 12/2010 |
| WO | 2017040830 | 3/2017 |
| WO | 2017148155 | 9/2017 |
| WO | 2018071808 | 4/2018 |

OTHER PUBLICATIONS

Moore, "Pinpoint microwave resolution could lead to wireless power", Apr. 24, 2008, 2 pages.

Smith et al., "An Analysis of Beamed Wireless Power Transfer in the Fresnel Zone Using a Dynamic, Metasurface Aperture", Duke University, Department of Electrical and Computer Engineering, Center for Metamaterials and Integrated Plasmonics, 2017, 27 pages.

Wang et al., "Experiments on Wireless Power Transfer", Mitsubishi Electric Research Laboratories, Appl. Phys. Lett., Jun. 2011, 5 pages.

Wang et al., "Wireless Power Transfer based on Metamaterials", Mitsubishi Electric Research Laboratories,, Nov. 2016, 24 pages.

* cited by examiner

WIRELESS ENERGY TRANSFER IN A FAR-FIELD ENVIRONMENT

TECHNICAL FIELD

This disclosure relates generally to transferring energy wirelessly, and more specifically relates to transferring wireless energy to a mobile device in a far-field environment.

BACKGROUND

Wireless energy transfer often requires that the source of energy be located close to the device to which the energy is being transferred. Energy can be transferred using near-field wireless transmission techniques such as induction based on magnetic fields in close proximity to the antenna. But the amount of energy transfer drops off significantly with distance. For example, beyond one to three feet, the energy transfer is negligible. To address this issue, near-field technologies have employed large parabolic antenna systems, such as satellite dishes, to focus the electromagnetic fields. But this technique can be difficult to implement due to costs and logistics of having such large equipment that is difficult to aim. And the target device to be charged cannot be moved while still being charged.

Transferring energy wirelessly in a far field—a large distance from the antenna—can be difficult because of the drop in energy transfer due to distance and the difficulty in aiming a beam at a target device that is far from the antenna. Global positioning systems (GPSs) can allow a device determine its location and velocity by measuring the time it takes to receive radio signals from four or more overhead satellites. Due to various error sources, standard GPS yields position measurements accurate to approximately ten meters. Differential GPS (DGPS), which enhances the system through a network of fixed, ground-based reference stations, has improved accuracy to about one meter. But meter-level accuracy is not sufficient to support accurate far-field wireless energy transfer, particularly for moving target devices.

SUMMARY

In one example, an antenna system includes a first type of metamaterial and a second type of metamaterial. The first type of metamaterial is positioned on a first portion of an antenna element for shaping a beam of a power signal. The second type of metamaterial positioned on a second portion of the antenna element for constraining the beam. A position of the antenna element is controllable based on location information about a mobile device for wirelessly transmitting the beam for charging a power source associated with the mobile device.

In another example, an antenna controller includes an antenna actuator, a processor device, and a non-transitory computer-readable medium having instructions stored thereon that are executable by the processor device for performing operations. The operations can include receiving position information about a mobile device from a location system, receiving motion and direction information about the mobile device from an inertial navigation system associated with the mobile device, receiving height information about the mobile device from an internal measurement unit associated with the mobile device, determining a predicted position of the mobile device using the position information, the motion and direction information, and the height information, and outputting a command to the antenna actuator to change the position of an antenna element based on the predicted position of the mobile device. The antenna actuator is configured to control the position of the antenna element in response to receiving the command to wirelessly transmit a beam of a power signal for charging a power source associated with the mobile device. The antenna element has different types of metamaterials thereon for transmitting the beam.

In another example, a method can include performing steps in response to receiving a request from a mobile device to wirelessly transmit a beam of a power signal to charge a power source associated with the mobile device. The steps can include receiving position information about the mobile device from a location system, receiving motion and direction information about the mobile device from an inertial navigation system associated with the mobile device, receiving height information about the mobile device from an internal measurement unit associated with the mobile device, determining, by an antenna controller, a predicted position of the mobile device using the position information, the motion and direction information, and the height information, controlling a position of an antenna element based on the predicted position, and wirelessly transmitting, by the antenna element having different types of metamaterials thereon, the beam to the mobile device.

These illustrative examples are mentioned not to limit or define the disclosure, but to provide examples to aid understanding thereof. Additional embodiments are discussed in the Detailed Description, and further description is provided there

DETAILED DESCRIPTION

Figure 1:
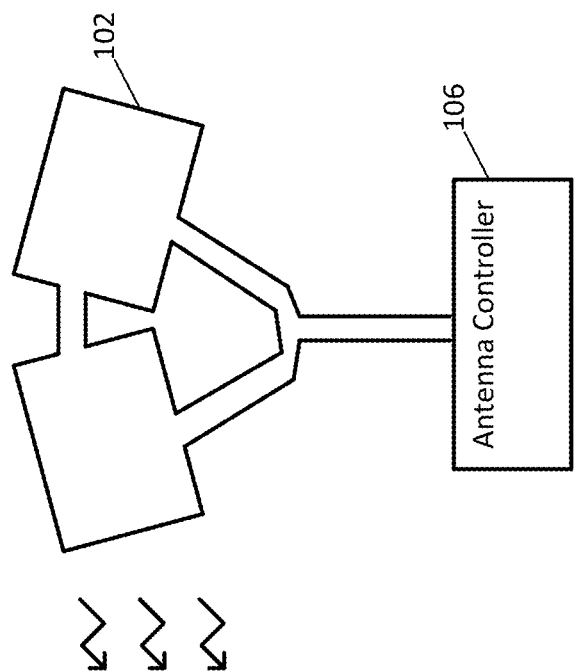
FIG. 1 is a schematic of a wireless power transfer environment in which power can be transferred wirelessly from an antenna to a mobile device according to one example of the present disclosure.
Figure 1:
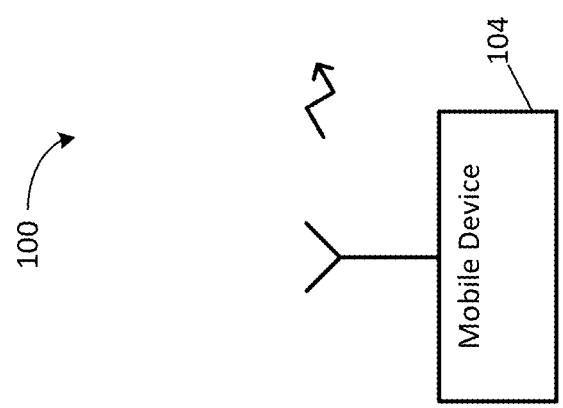

Certain aspects and features relate to determining a predicted position of a mobile device and controlling an antenna with different types of metamaterials thereon for wirelessly transmitting power to the mobile device for charging a power source associated with the mobile device. The different types of metamaterials can include one type of metamaterials for shaping a beam of power and another type of metamaterials for constraining the beam. The predicted position of the mobile device can be determined from position information, such as GPS coordinates, motion and direction information from an inertial navigation system (INS) of the mobile device, and height information from an inertial measurement unit (IMU) of the mobile device. The position of the antenna can be controlled based on the predicted position such that the beam of power can be directed to the mobile device in the Fresnel zone as the mobile device moves through the environment. The Fresnel zone is a region of an electromagnetic field that can be focused, allowing power density to reach levels sufficient to charge devices with high efficiency. Using the predicted position with different types of metamaterials can allow for far-field wireless power transfers. Examples of the mobile device include a mobile telephone, an electric vehicle, and a robotic device such as those used in manufacturing or providing services.

A system according to some examples can provide wireless energy transfer at a distance through sculpted electromagnetic microwaves and an enhanced location tracking system. The system can include an optical metamaterial microwave transmitter with at least two different types of optical metamaterials. A metamaterial is a material engineered to produce properties that do not occur naturally. For example, a metamaterial can include an array of structures smaller than the wavelength of interest and a metamaterial can be designed to interact with electromagnetic radiation in a desired fashion, such as by blocking, absorbing, enhancing, or bending waves, beyond what is possible with natural materials. One type of metamaterial can include synthetic diamond-crystal metamaterial for constraining and focusing the energy beam. The other type can be optical metamaterial tuned to shape high power-density electromagnetic microwaves. The antenna can include cells with the different metamaterials. In some examples, the antenna is a dual-panel transmitter with two antenna elements, each of which having cells with the different types of metamaterials thereon. The beam of power can be constrained to operate with the Fresnel zone. A Fresnel zone is one of a series of concentric prolate ellipsoidal regions of space between and around a transmitting antenna and a receiving antenna system. It can be used to compute the strength of waves propagating between a transmitter and a receiver. The primary Fresnel zone (i.e., N=1) can ideally be 80% clear of obstacles, or at least 60% clear. The beam of power can be constructed to precise specifications, maximizing distance and efficiency.

Using optical metamaterials according to some examples can precisely shape waves, such as microwaves with which power can be transferred. Using other types of optical metamaterials, such as synthetic diamond-crystal metamaterials, can precisely direct light waves. The combination of these two types of metamaterials can provide a relatively small antenna system that can produce compacted microwave beams that can travel long distances with dynamic targeting capability.

And using data from GPS, INS, and IMU systems according to some examples can result in accuracy in the position of the mobile device to which to transfer power. For example, the position can be determined with centimeter-level accuracy. The GPS or other position system can provide data to achieve high accuracy. The IMU can provide data to achieve high sample rates and high bandwidth, continuously. An IMU can include an electronic device that measures and reports a body's specific force, angular rate, and, sometimes, the magnetic field surrounding the body, using a combination of accelerometers and gyroscopes, and in some examples magnetometers. An INS is a navigation aid that uses a computer, motion sensors, such as accelerometers, and rotation sensors, such as gyroscopes, to continuously calculate via dead reckoning the position, orientation, velocity, and direction of movement of a moving object without the need for external references. Dead reckoning is the process of calculating a current position by using a previously determined position, or fix, and advancing that position based upon known or estimated speeds over elapsed time and course.

Achieving a high level of accuracy, such as at the centimeter level, with computational loads that are suitable for real-time applications on low-power processors can advance the capabilities of highly specialized navigation systems, such as those used in driverless cars and precision agriculture. It can also improve location services accessed through mobile phones and other personal devices, without increasing cost.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

FIG. 1 is schematic of a wireless power transfer environment 100 in which power can be transferred wirelessly from an antenna 102 to a mobile device 104 according to one example of the present disclosure. Also included in the wireless power transfer environment 100 is antenna controller 106 that can control the position of the antenna 102 based on a predicted position of the mobile device 104 in the environment 100.

The mobile device 104 can be in a far-field location relative to the antenna 102. For example, the antenna controller 106 and antenna 102 may be co-located with a base transceiver station for wirelessly transmitting voice and data signals to mobile devices. And the mobile device 104 may be a mobile telephone carried by a user in a coverage area of the base transceiver station.

In some examples, the mobile device 104 can be moving in the environment 100 and output a request to receive power wirelessly for charging a power source associated with the mobile device 104. The power source may be in the mobile device 104 or communicatively coupled to the mobile device 104. The power source can be a rechargeable power source that can use the power received wirelessly from the antenna 102 to charge. In response to receiving the request, the antenna controller 106 can also receive information from the mobile device 104 and use the information to determine a predicted position for the mobile device 104 in the environment 100. Based on the predicted position, the antenna controller 106 can control the position of the antenna 102 to output a beam of power to the mobile device 104 such that the beam is constrained within the Fresnel zone. The antenna 102 is depicted as a dual-transmitter antenna with two antenna elements. In other examples, the antenna 102 can have one antenna element or more than two antenna elements. Each antenna element can have different types of metamaterials positioned thereon. The different types of metamaterials can include a type of metamaterial to shape the beam and another type of metamaterial to constrain the beam to help the beam stay in the Fresnel zone between the antenna 102 and the mobile device 104. Shaping the beam can include preventing the waveform of energy from deviating beyond a threshold amount as compared to an ideal waveform, focusing the beam toward a selected direction, preventing the beam from being transmitted as multiple waveforms, or a combination of these and other forms of beam shaping. Constraining the beam can include preventing the beam of energy from deviating, directionally in the Fresnel zone, beyond a selected amount as compared to the direction to which the beam is outputted. For example, shaping the beam can cause the beam to be outputted in a desirable direction with respect to the Fresnel zone, and constraining the beam can more precisely direct the beam by preventing the beam from expanding beyond a threshold amount as compared to the intended direction.

Figure 2:
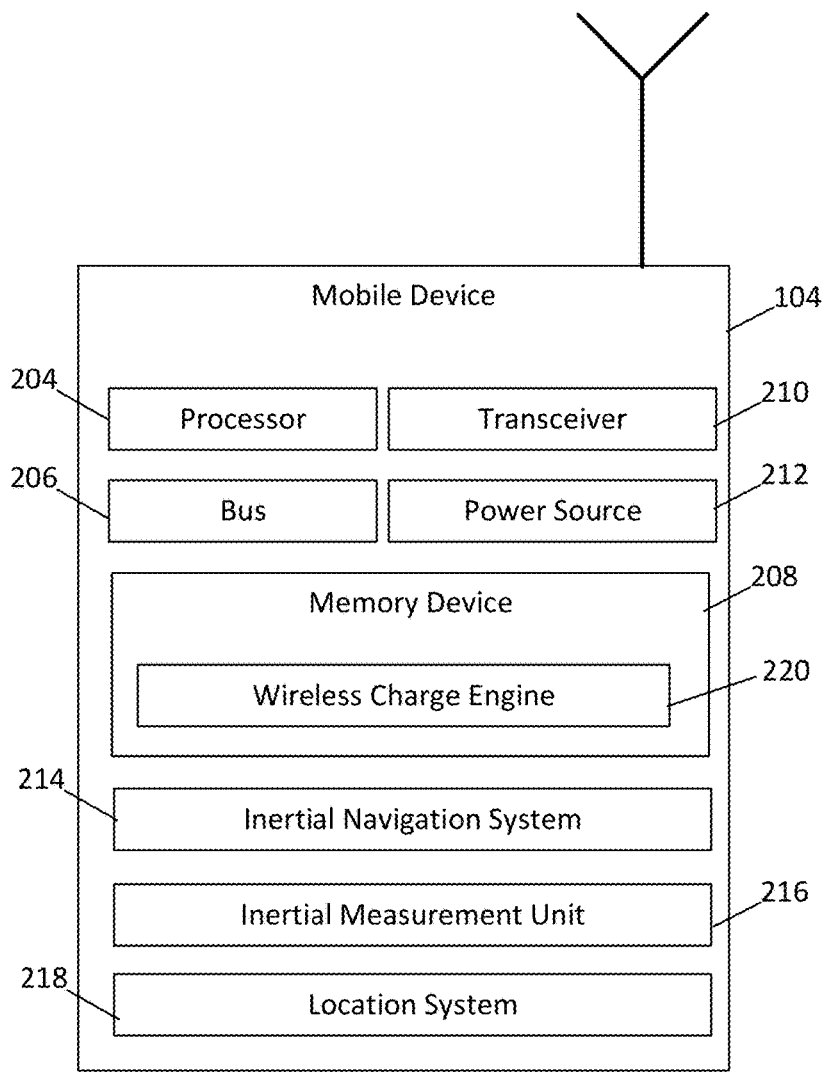
FIG. 2 is a block diagram of a mobile device that can receive power wirelessly for recharging a power source associated with the mobile device according to one example of the present disclosure.

FIG. 2 is a block diagram of the mobile device 104 from FIG. 1 according to one example of the present disclosure. The mobile device 104 can include a processor 204, a memory 208, a bus 206, a transceiver 210, and a power source 212. Also included in the mobile device 104 are an inertial navigation system (INS) 214, an inertial measurement system (IMU) 216, and a location system 218. In some examples, some or all of the components shown in FIG. 2 can be integrated into a single structure, such as a single housing. In other examples, some or all of the components shown in FIG. 2 can be distributed (e.g., in separate housings) and in electrical communication with each other.

The transceiver 210 can include circuitry that can modulate and transmit data signals and that can demodulate power signals received wirelessly. An example of the power source 212 is a rechargeable battery.

The INS 214 can include motion sensors, such as accelerometers, and rotation sensors, such as gyroscopes, to sense and determine the position, orientation, and velocity of the mobile device 104 via dead reckoning. The IMU 216 can include an electronic device that measures and reports a body's specific force, angular rate, and, sometimes, the magnetic field surrounding the body, using a combination of accelerometers and gyroscopes, and in some examples magnetometers. The IMU can determine height information about the mobile device 104 from the specific force and angular rate. The location system 218 can determine a position for the mobile device 104. An example of the location system 218 is a global positioning system.

The processor 204 can execute one or more operations for requesting wireless power transfer and providing information that can be used by an antenna controller to deliver the power wirelessly to the mobile device 104. The processor 204 can execute instructions stored in the memory 208 to perform the operations. An example of the instructions is a wireless charge engine 220 that can be used to cause a request to be transmitted by the transceiver 210 and to provide the information from the INS 214, IMU 216, and location system 218 to the antenna controller. The wireless charge engine 220 can also cause power received wirelessly to be provided to the power source 212 to charge the power source 212. The processor 204 can include one processing device or multiple processing devices. Non-limiting examples of the processor 204 include a Field-Programmable Gate Array ("FPGA"), an application-specific integrated circuit ("ASIC"), a microprocessor, etc.

The processor 204 can be communicatively coupled to the memory 208 via the bus 206. The non-volatile memory 208 may include any type of memory device that retains stored information when powered off. Non-limiting examples of the memory 208 include electrically erasable and programmable read-only memory ("EEPROM"), flash memory, or any other type of non-volatile memory. In some examples, at least some of the memory 208 can include a medium from which the processor 204 can read instructions. A computer-readable medium can include electronic, optical, magnetic, or other storage devices capable of providing the processor 204 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

Figure 3:
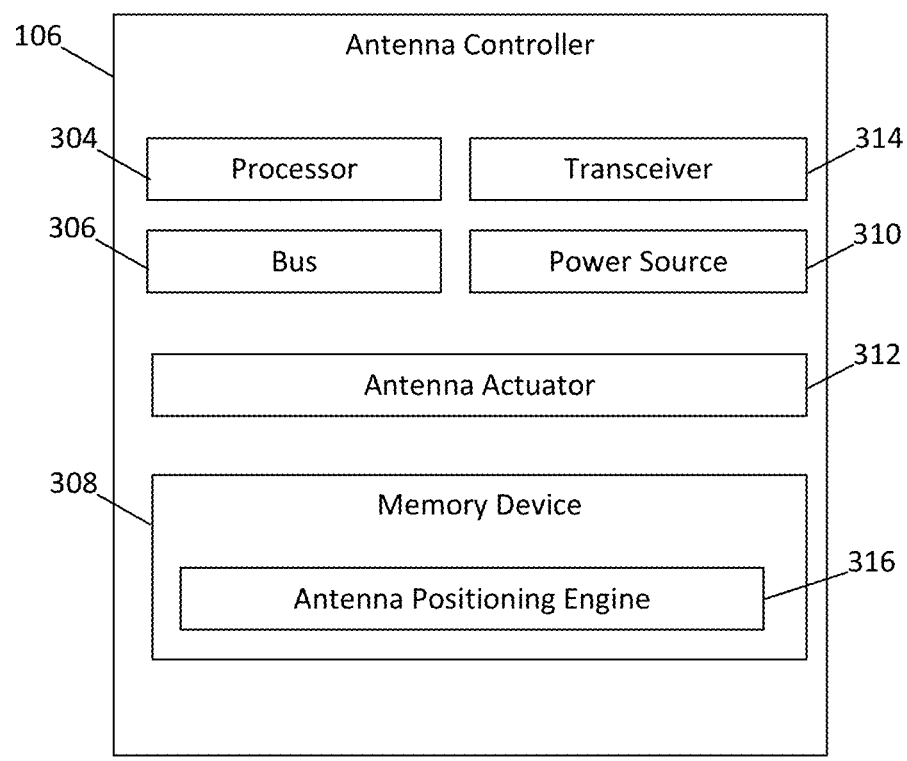
FIG. 3 is a block diagram of an antenna controller for controlling a position of an antenna that can wirelessly transmit power to a mobile device for recharging a power source associated with the mobile device according to one example of the present disclosure.

FIG. 3 is a block diagram of the antenna controller 106 from FIG. 1 according to one example of the present disclosure. The antenna controller 106 includes a processor 304, a bus 306, a memory device 308, and a power source 310. Examples of the power source 310 can include a generator, a battery, or access to a municipal or private power company. Also included in the antenna controller 106 is an antenna actuator 312, which can be used to move the position of an antenna, such as antenna 102 from FIG. 1, coupled to the antenna controller 106. The antenna controller 106 can also include a transceiver 314 that can modulate power from the power source 310 onto a carrier wave, such as a microwave, and provide the modulated power signal to the antenna for wirelessly transmitting the modulated power signal.

The processor 304 can execute one or more operations for determining a predicted position for a mobile device and outputting commands to the antenna actuator 312 and the transceiver 314 for controlling the position of an antenna and transmitting a power signal, respectively. The processor 304 can execute instructions stored in the memory device 308 to perform the operations. An example of the instructions is an antenna positioning engine 316 that can be used to determine a predicted position of the mobile device using information from the IMU, INS, and location system of the mobile device and output commands to cause the antenna actuator 312 to change the position of the antenna based on the predicted position. The processor 304 can include one processing device or multiple processing devices. Non-limiting examples of the processor 304 include a FPGA, an ASIC, a microprocessor, etc.

The processor 304 can be communicatively coupled to the memory 308 via the bus 306. The non-volatile memory 308 may include any type of memory device that retains stored information when powered off. Non-limiting examples of the memory 308 include EEPROM, flash memory, or any other type of non-volatile memory. In some examples, at least some of the memory 308 can include a medium from which the processor 304 can read instructions. A computer-readable medium can include electronic, optical, magnetic, or other storage devices capable of providing the processor 304 with computer-readable instructions or other program code. Non-limiting examples of a computer-readable medium include (but are not limited to) magnetic disk(s), memory chip(s), ROM, RAM, an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

Figure 4:
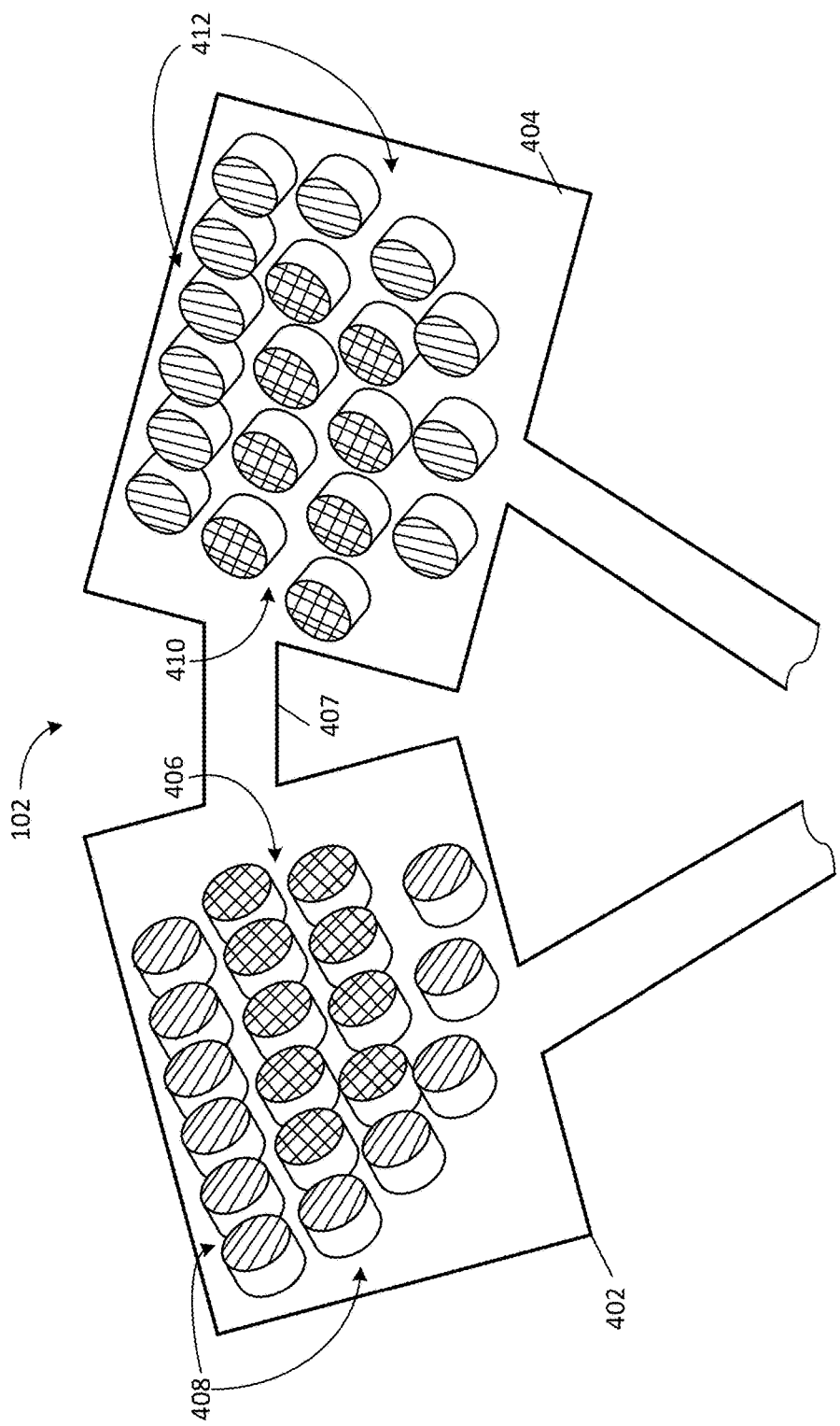
FIG. 4 is a perspective view of an antenna with different types of metamaterials for wirelessly transmitting power to a mobile device for recharging a power source associated with the mobile device according to one example of the present disclosure.

FIG. 4 is a perspective view of the antenna 102 of FIG. 1 with different types of metamaterials for wirelessly transmitting power to a mobile device for recharging a power source associated with the mobile device according to one example of the present disclosure. The antenna 102 is a dual-panel antenna with two transmission elements 402, 404 that may also be referred to as "panels." The transmission elements 402, 404 can be coupled by a stabilizer bar 407. The stabilizer bar 407 can maintain the position of one transmission element 402 with respect to the other transmission element 404.

Each of the transmission elements 402, 404 can include cells of metamaterials positioned on a transmission surface. The cells of metamaterials can include different types of metamaterials on each of the transmission elements 402, 404. Any number of cells for each of the types of metamaterials can be used. In FIG. 4, transmission element 402 has cells 406 of a first type of metamaterial and cells 408 of a second type of metamaterial. And transmission element 404 has cells 410 of the first type of metamaterial and cells 412 of the second type of metamaterial. On each of the transmission elements 402, 404, cells 406, 410 of the first type of metamaterial are positioned between cells 408, 412 of the second type of metamaterial. The first type of metamaterial can shape the beam of the power signal and the second type of metamaterial can constrain the beam. An example of the first type of metamaterial is an optical metamaterial. An example of the second type of metamaterial is synthetic diamond-crystal metamaterial.

The position of the antenna 102 can be controlled by an antenna controller by rotating the antenna such that the transmission elements 402, 404 are positioned to transmit the power signal toward the mobile device. The position of each of the cells 406, 408, 410, 412 can also be controlled by the antenna controller to cause the antenna 102 to transmit the beam in the Fresnel zone for the predicted position of the mobile device.

Although the antenna 102 is shown as having two transmission elements 402, 404, an antenna according to other examples may have one transmission element or more than two transmission elements. Each transmission element of an antenna according to various examples can have different types of metamaterials positioned on the transmission element. The number of different types of metamaterials can vary. For example, an antenna according to some examples can have a transmission element with more than two types of metamaterials. And, the cells with the different types of metamaterials can be positioned on the transmission in any configuration.

Figure 5:
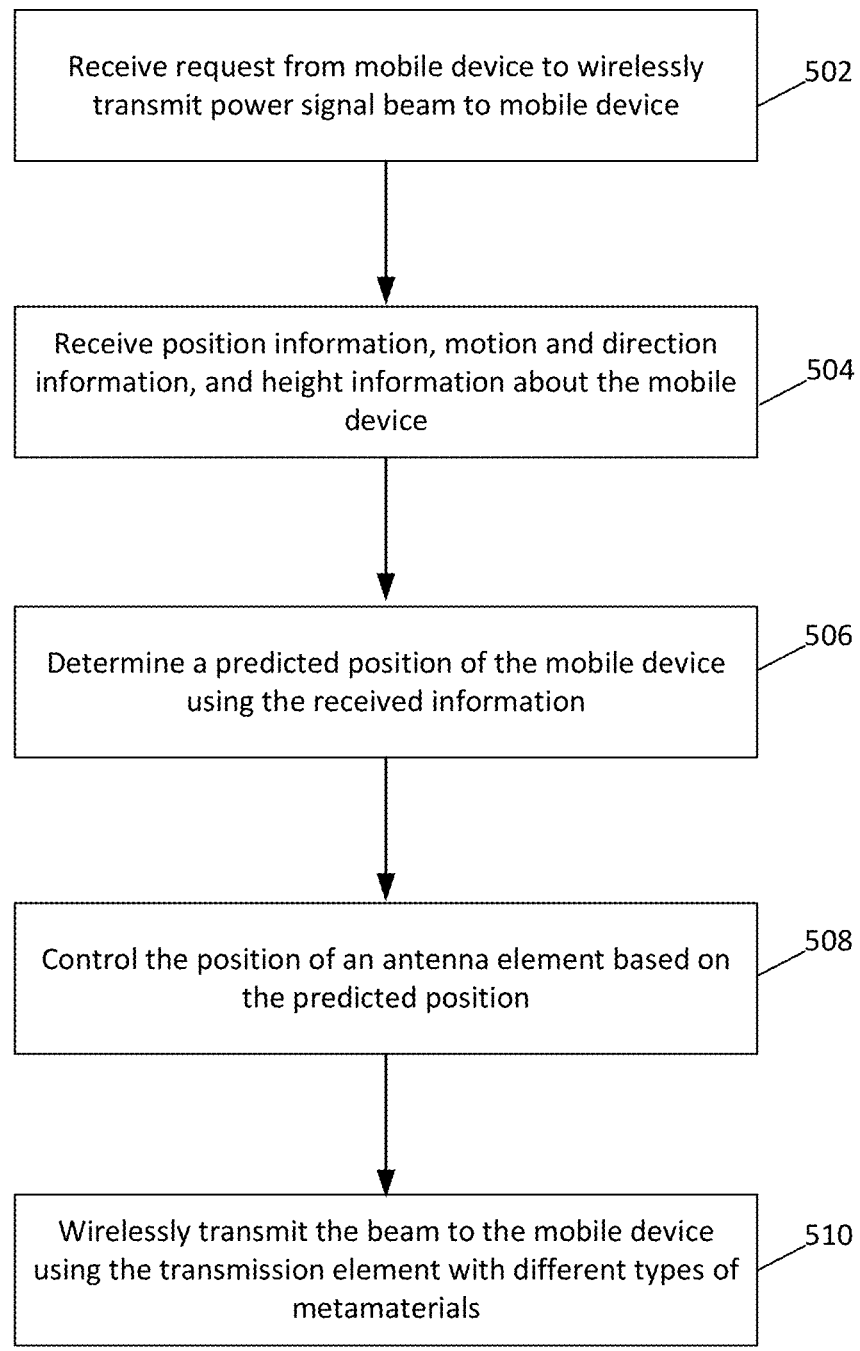
FIG. 5 is a flowchart of a process for wirelessly transmitting power to a mobile device for recharging a power source associated with the mobile device according to one example of the present disclosure.

FIG. 5 is a flowchart of a process for wirelessly transmitting power to a mobile device for recharging a power source associated with the mobile device according to one example of the present disclosure. The process of FIG. 5 can be implemented by the antenna controller 106 and the antenna 102 of FIG. 1, but can also be performed by other devices, components, or systems.

In block 502, the antenna controller 106 receives a request from a mobile device in a far-field environment to wirelessly transmit a power signal beam to the mobile device. The request from the mobile device can be received in the same channel that the power is delivered to the mobile device or via a separate channel. For example, the antenna controller 106 can include a separate antenna that can receive data signals transmitted by the mobile device, along with circuitry for demodulating and decoding the data signals. The request can identify the mobile device and request power for charging a power source associated with the mobile device.

In response to receiving the request, the antenna controller 106 receives position information, motion and direction information, and height information about the mobile device in block 504. The information can be received via the same channel as the request. In some examples, the information is received substantially contemporaneously to receiving the request. The position information can be from a location system in or associated with the mobile device. An example of the location system is a GPS. The position information can include a current location represented by coordinates. The motion and direction information can be from an INS in or associated with the mobile device. The motion and direction information can represent the velocity at which the mobile device is moving along with a vector indicating a direction of that movement. The height information can be from an IMU in or associated with the mobile device. The height information can represented the current position of the mobile device above ground level.

In block 506, the antenna controller 106 determines a predicted position of the mobile device using the position information, motion and direction information, and the height information. A predicted position of the mobile device can be determined by any suitable process. In one example, the location information is used to determine a current or near-current location of the mobile device, represented as an X-Y coordinate. The height information can provide the current or near-current Z coordinate of the mobile device. The motion and direction information can provide the velocity of movement and direction of movement of the mobile device. The predicted position can be a new X-Y-Z coordinate that is based on the amount of time since the information was transmitted by the mobile device and modified from the current or near-current location based on the motion and direction of movement.

Another example of a suitable process can include determining a static prediction based on historical information of either the devices known to the system or a subset of devices (as determined by demographics, personal identifiers, etc.), where historical location occurrences have been used to train a model. This model, which may be a deep neural network or another type of model, can use any form of machine learning to produce a statistical average, bounding box regression, or simple classifier for in- our out-of-bounds conditions. In other examples, an adaptive model, using particle-filtering methods (such as Kalman filtering) that use incremental sample updates and probabilistic expectations for next sample movement can be used. The instantaneous error may be lower than a static model because it uses real-time inputs to estimate positions, but it may not contain the stability of many observations across users. In a further example, a hybrid model such as an expectation maximization (EM) model or a relevance feedback and reinforcement learning model (RF-RL) may be used. In this class of models, static estimations from a pre-built model are computed at regular intervals, but those models (or their outputs) are adapted with real-time updates. For example, an expectation maximization model can alternate between an expected value prediction stage and a best-fit optimization stage. In another example, reinforcement-learning models can adaptively select different actions (underlying predictors) that best align with observed conditions in the environment based on prior actions. The reinforcement-learning model can internally switch between a linear predictor (e.g. a device moving in a straight line) and a parametric or static mode (e.g. a device following a road or slowly coming to a stop) based on the observed conditions (e.g. real-time positioning confirmation from GPS or IMU sensors). These predictive processes may be used independently, or in aggregate, and may be executed locally (on device), at an edge location (an antenna element) or in a distributed service (a cloud environment) based on the needs and availability of the requested data and resources.

In block 508, the antenna controller 106 can use an actuator to control the position of the antenna 102 based on the predicted position. The antenna controller 106 can control the position of the antenna 102 by controlling a direction at which transmission elements of the antenna 102 faces, the direction at which one or more cells with metamaterial faces, which cells with metamaterial are operable, or a combination of these or other position controls. The position of the antenna 102 can be controlled based on the predicted position so that the beam of power that is transmitted wirelessly is in the Fresnel zone with respect to the mobile device 104 and the antenna 102.

In block 510, the antenna 102 wirelessly transmits the beam to the mobile device 104 using one or more transmission elements with different types of metamaterials that can shape and constrain the beam.

The antenna controller 106 can continuously or periodically receive the position information, motion and direction information, and height information about the mobile device 104, determine new predicted positions, and control the position of the antenna 102 based on each predicted position until the antenna controller 106 determines or predicts that the mobile device 104 is outside of the Fresnel zone.

Figure 6:
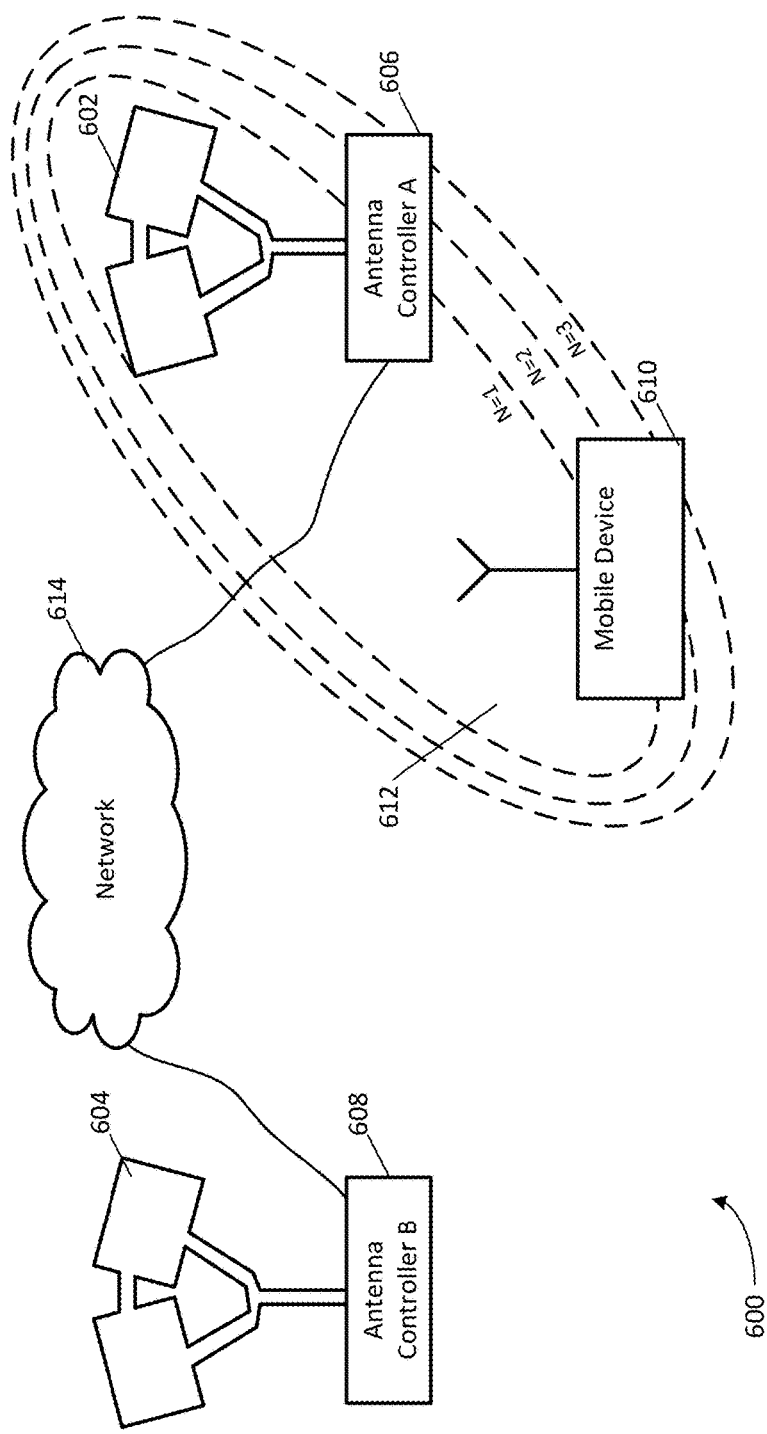
FIG. 6 is a schematic view of a wireless power transfer environment in which a first antenna is wirelessly transmitting power to a mobile device according to one example of the present disclosure.
Figure 7:
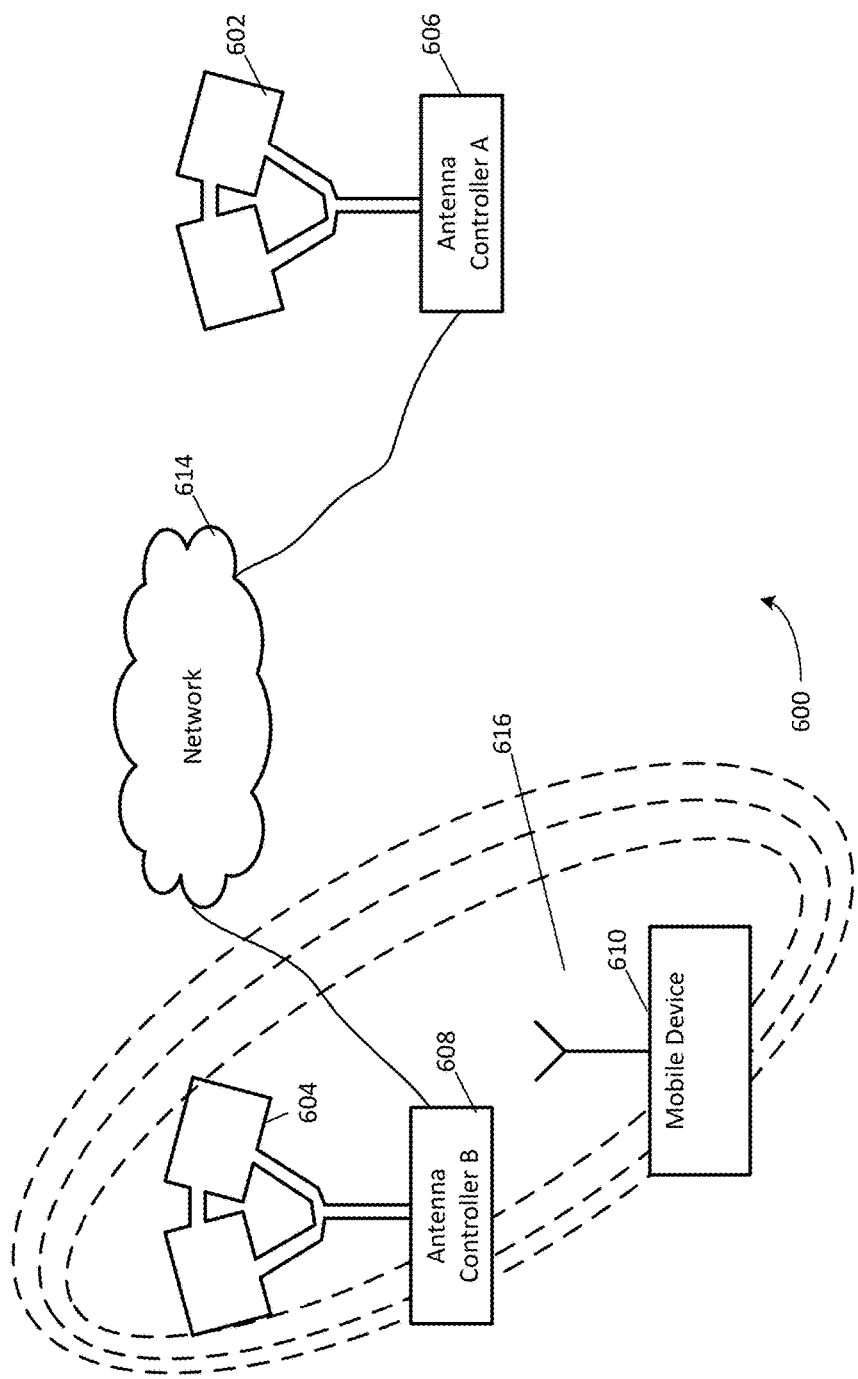
FIG. 7 is a schematic view of the wireless power transfer environment of FIG. 6 in which the first antenna has handed off wirelessly transmitting power to a second antenna for wirelessly transmitting power to the mobile device according to one example of the present disclosure.

Mobile devices moving in an environment may move beyond the effective reach of antenna to wirelessly transmit power to the mobile device. One antenna controller may be able to handoff responsibility of wirelessly transmitting power to a second antenna controller and antenna pair. FIGS. 6 and 7 are schematic views of a wireless power transfer environment 600 with two antennas 602, 604 associated with separately located antenna controllers: antenna controller A 606 for antenna 602 and antenna controller B 608 for antenna 604. A mobile device 610 is moving in the environment 600.

In FIG. 6, the mobile device 610 is in a Fresnel zone 612 associated with the antenna 602, which is wirelessly transmitting power to the mobile device 610 in accordance with part of all of the process described with respect to FIG. 5. The Fresnel zone 612 can be defined by a primary Fresnel zones (labeled N=1 in FIG. 6) and one or more secondary Fresnel zones (labeled N=2 and N=3, respectively, in FIG. 6).

The mobile device 610 can move to a position at which it is outside of the Fresnel zone 612. The antenna controller A 606 can detect that the predicted position of the mobile device 610 is outside of the Fresnel zone 612 and then output a notification to the antenna controller B 608, or another neighboring antenna system, via network 614 with an instruction for antenna 604 to wirelessly transfer power to the mobile device 610. The network 614 may be any type of communication network and can be wired, wireless, or a combination of wired and wireless.

In response to receiving the notification, the antenna controller B 608 can receive information from the mobile device 610 and control the antenna 604 in wirelessly transmitting power to the mobile device 610, as shown in FIG. 7 in which the mobile device 610 is within the Fresnel zone 616 of antenna 604. In this manner, the mobile device 610, which may be any type of device such as a moving passenger vehicle, a mobile telephone, or a robotic device in a manufacturing environment can continue to receive power for charging a power source associated with the mobile device 610 while moving through the environment 600.

The implementations described herein are examples, and the features of different implementations may be combined to achieve many different techniques, without departing from the described implementations. For all of the provided examples and figures, the values and ranges are examples only, and may be changed without departing from the scope of the disclosure.

The foregoing descriptions and examples are provided for purposes of illustrating, explaining, and describing aspects of the present disclosure. Further modifications and adaptations to these examples will be apparent to those skilled in the art and may be made without departing from the scope of the disclosure. The systems and methods represented here may be implemented independently, in conjunction with a different one of the systems described, or in conjunction with a system not described herein.

What is claimed is:

1. An antenna system, comprising:
a first type of metamaterial positioned on a first portion of an antenna element for shaping a beam of a power signal;
a second type of metamaterial positioned on a second portion of the antenna element for constraining the beam; and
a controller comprising an antenna actuator, a processor device, and a non-transitory computer-readable medium having instructions stored thereon that are executable by the processor device for performing operations, the operations comprising:
obtaining position information about a mobile device;
obtaining motion and direction information associated with the mobile device, and height information associated with the mobile device;
determining a predicted position of the mobile device using the position information, the motion and direction information, and the height information; and
outputting a command to the antenna actuator to change a position of the antenna element based on the predicted position of the mobile device,
wherein the position of the antenna element is controllable by the antenna actuator in response to the command, for wirelessly transmitting the beam for charging a power source associated with the mobile device.

2. The antenna system of claim 1, wherein the antenna element comprises:
a first transmission element; and
a second transmission element forming a dual-panel transmitter with the first transmission element,
wherein each of the first transmission element and the second transmission element includes the first type of metamaterial and the second type of metamaterial, the first transmission element and the second transmission element being configured to wirelessly transmit the beam.

3. The antenna system of claim 2, wherein each of the first transmission element and the second transmission element includes a plurality of cells that include cells of the first type of metamaterial positioned between cells of the second type of metamaterial.

4. The antenna system of claim 1, wherein:
the position information about the mobile device is received from a location system;

the motion and direction information about the mobile device is received from an inertial navigation system associated with the mobile device; and the height information about the mobile device is received from an inertial measurement unit associated with the mobile device.

5. The antenna system of claim 4, wherein the location system is a global positioning system, wherein each of the inertial navigation system and the inertial measurement unit includes at least one accelerometer and at least one gyroscope, wherein the motion and direction information includes velocity and direction of movement by the mobile device, wherein the height information includes a distance above ground for the mobile device.

6. The antenna system of claim 4, wherein the operations further comprise:

determining that the predicted position of the mobile device is outside of a Fresnel zone for the antenna element; and in response to determining that the predicted position of the mobile device is outside of the Fresnel zone for the antenna element, outputting a notification to a second antenna system to wirelessly transfer power to the mobile device.

7. The antenna system of claim 1, wherein the first type of metamaterial comprises an optical metamaterial and the second type of metamaterial comprises synthetic diamond-crystal metamaterial.

8. The antenna system of claim 1, wherein the mobile device is selected from the group consisting of a moving passenger vehicle, a mobile telephone, and a robotic device in a manufacturing environment.

9. An antenna controller, comprising:

an antenna actuator;

a processor device; and a non-transitory computer-readable medium having instructions stored thereon that are executable by the processor device for performing operations, the operations comprising:

receiving position information about a mobile device from a location system;

receiving motion and direction information about the mobile device from an inertial navigation system associated with the mobile device;

receiving height information about the mobile device from an inertial measurement unit associated with the mobile device;

determining a predicted position of the mobile device using the position information, the motion and direction information, and the height information; and outputting a command to the antenna actuator to change a position of an antenna element based on the predicted position of the mobile device, wherein the antenna actuator is configured to control the position of the antenna element in response to receiving the command to wirelessly transmit a beam of a power signal for charging a power source associated with the mobile device, the antenna element having different types of metamaterials thereon for transmitting the beam.

10. The antenna controller of claim 9, wherein the different types of metamaterials comprise:

a first type of metamaterial positioned on a first portion of the antenna element for shaping the beam; and a second type of metamaterial positioned on a second portion of the antenna element for constraining the beam.

11. The antenna controller of claim 10, wherein the antenna element comprises:

a first transmission element; and a second transmission element forming a dual-panel transmitter with the first transmission element, wherein each of the first transmission element and the second transmission element includes the first type of metamaterial and the second type of metamaterial, the first transmission element and the second transmission element being configured to wirelessly transmit the beam.

12. The antenna controller of claim 11, wherein each of the first transmission element and the second transmission element includes a plurality of cells that include cells of the first type of metamaterial positioned between cells of the second type of metamaterial.

13. The antenna controller of claim 9, wherein the location system is a global positioning system, wherein each of the inertial navigation system and the inertial measurement unit includes at least one accelerometer and at least one gyroscope, wherein the motion and direction information includes velocity and direction of movement by the mobile device, wherein the height information includes a distance above ground for the mobile device.

14. The antenna controller of claim 9, wherein the operations further comprise:

determining that the predicted position of the mobile device is outside of a Fresnel zone for the antenna element; and in response to determining that the predicted position of the mobile device is outside of the Fresnel zone for the antenna element, outputting a notification to a second antenna controller associated with a second antenna element at a separate location than the antenna controller, the notification including a command for the second antenna element to wirelessly transfer power to the mobile device.

15. A method, comprising:

in response to receiving a request from a mobile device to wirelessly transmit a beam of a power signal to charge a power source associated with the mobile device:

receiving position information about the mobile device from a location system;

receiving motion and direction information about the mobile device from an inertial navigation system associated with the mobile device;

receiving height information about the mobile device from an inertial measurement unit associated with the mobile device;

determining, by an antenna controller, a predicted position of the mobile device using the position information, the motion and direction information, and the height information;

controlling a position of an antenna element based on the predicted position; and wirelessly transmitting, by the antenna element having different types of metamaterials thereon, the beam to the mobile device.

16. The method of claim 15, further comprising:

determining that the predicted position of the mobile device is outside of a Fresnel zone for the antenna element; and in response to determining that the predicted position of the mobile device is outside of the Fresnel zone for the antenna element, outputting a notification to a second antenna controller associated with a second antenna element at a separate location than the antenna controller, the notification including a command for the second antenna element to wirelessly transfer power to the mobile device.

17. The method of claim 15, wherein wirelessly transmitting, by the antenna element having different types of metamaterials thereon, the beam to the mobile device comprises:
   shaping the beam by a first type of metamaterial positioned on a first portion of the antenna element; and
   constraining the beam by a second type of metamaterial positioned on a second portion of the antenna element.

18. The method of claim 17, wherein the first type of metamaterial comprises an optical metamaterial and the second type of metamaterial comprises synthetic diamond-crystal metamaterial.

19. The method of claim 15, wherein the mobile device is selected from the group consisting of a moving passenger vehicle, a mobile telephone, and a robotic device in a manufacturing environment.

20. The method of claim 15, wherein the location system is a global positioning system, wherein each of the inertial navigation system and the inertial measurement unit includes at least one accelerometer and at least one gyroscope, wherein the motion and direction information includes velocity and direction of movement by the mobile device, wherein the height information includes a distance above ground for the mobile device.

\* \* \* \* \*